United States Patent
Xu et al.

(10) Patent No.: US 12,203,440 B1
(45) Date of Patent: Jan. 21, 2025

(54) WAVE ENERGY PRESSURE AMPLIFICATION DEVICE AND MARINE RANCHING FEEDING SYSTEM AND METHOD

(71) Applicant: Guangdong Ocean University, Zhanjiang (CN)

(72) Inventors: Qing Xu, Zhanjiang (CN); Shengxian Xian, Zhanjiang (CN); Haowei Li, Zhanjiang (CN); Shenwei Zhang, Zhanjiang (CN); Yingchen Su, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 18/826,229

(22) Filed: Sep. 6, 2024

Related U.S. Application Data (63) Continuation of application No. PCT/CN2024/105122, filed on Jul. 12, 2024.

(30) Foreign Application Priority Data

Oct. 31, 2023 (CN) .......................... 202311430173.2

(51) Int. Cl.
*F03B 13/24* (2006.01)
*A01K 61/80* (2017.01)

(52) U.S. Cl.
CPC .............. *F03B 13/24* (2013.01); *A01K 61/80* (2017.01)

(58) Field of Classification Search
CPC ........ A01K 61/80; A01K 61/85; A01K 61/75; F03B 13/24
See application file for complete search history.

(56) References Cited

U.S. PATENT DOCUMENTS

| 6,812,588 B1 | 11/2004 | Zadig | |
| 11,637,479 B2 * | 4/2023 | Bonutti | F03B 13/1845 290/53 |

(Continued)

FOREIGN PATENT DOCUMENTS

| CN | 102506004 A | 6/2012 |
| CN | 203822120 U | 9/2014 |

(Continued)

*Primary Examiner* — Monica L Perry
*Assistant Examiner* — Aaron M Rodziwicz
(74) *Attorney, Agent, or Firm* — Bayramoglu Law Offices LLC (57) ABSTRACT

A wave energy pressure amplification device includes a transmission chamber, a compression chamber, an oil storage chamber and a buoy. The transmission chamber is filled with hydraulic oil, a first slider is arranged on the hydraulic oil and connected to the buoy, and the buoy is used to drive the first slider to move in the transmission chamber. The transmission chamber is connected to the compression chamber via a first pipeline, and the oil storage chamber is filled with hydraulic oil and connected to the transmission chamber via a second pipeline. The compression chamber is connected to an air pipeline, and the air pipeline is provided with an air outlet one-way valve. The transmission chamber is driven by the buoy to drive the compression chamber to compress by hydraulic oil, and the pressure is continuously increased to reach the set value and discharged from the air outlet.

12 Claims, 3 Drawing Sheets

(56) References Cited

U.S. PATENT DOCUMENTS

| | | | | |
|---|---|---|---|---|
| 11,719,219 | B2* | 8/2023 | Bonutti | F03B 13/1855 |
| | | | | 290/54 |
| 2017/0198401 | A1* | 7/2017 | Phillips | H02K 35/02 |
| 2020/0002828 | A1* | 1/2020 | Mills | H02S 40/42 |

FOREIGN PATENT DOCUMENTS

| | | | |
|---|---|---|---|
| CN | 110454319 | A | 11/2019 |
| CN | 110905717 | A | 3/2020 |
| CN | 111336058 | A | 6/2020 |
| CN | 114673623 | A | 6/2022 |
| EP | 4141252 | A1 | 3/2023 |

* cited by examiner

WAVE ENERGY PRESSURE AMPLIFICATION DEVICE AND MARINE RANCHING FEEDING SYSTEM AND METHOD

CROSS REFERENCE TO THE RELATED APPLICATIONS

This application is the continuation application of International Application No. PCT/CN2024/105122, filed on Jul. 12, 2024, which is based upon and claims priority to Chinese Patent Application No. 202311430173.2, filed on Oct. 31, 2023, the entire contents of which are incorporated herein by reference.

TECHNICAL FIELD

The present invention relates to the field of marine ranching device, in particular to a wave energy pressure amplification device and a marine ranching feeding system.

BACKGROUND

Wave energy power generation is a green and environmentally friendly power generation method, which is a technology to convert wave energy into electric energy, it mainly drives the generator to generate electricity through wave energy compressed air, and the compressed air technology mainly increases the potential energy of the air through the fluctuations of the wave, thus promoting the work of the turbine generator.

For example, the Chinese invention patent with Publication No. CN114673623A has disclosed a wave energy storage and utilization device based on air compression, which can convert wave energy into compressed energy of air, at the same time, store heat in the process of compressed air, and combine compressed energy and heat for power generation, so as to realize the storage and utilization of wave energy.

This is a way to directly compress air through the fluctuations of the sea surface, but direct compression is limited by the degree of fluctuations of the sea surface, and it is difficult to compress the air to a higher pressure. Even if the air compression is driven by the mechanical device, the increase of air pressure increases the compression resistance, which makes it difficult to be further compressed, resulting in the limited pressure of the outlet air, it is difficult to apply in some occasions with high requirements for air pressure.

SUMMARY

In view of the shortcomings of the existing art, the present invention aims to provide a wave energy pressure amplification device to amplify the pressure of an air outlet of the wave energy power generation device, so as to solve the problem of limited pressure at the air outlet, the specific technical scheme is as follows:

a first aspect of the present invention provides a wave energy pressure amplification device, wherein: including a transmission chamber, a compression chamber, an oil storage chamber and a buoy;

the transmission chamber is filled with hydraulic oil, and a first slider is arranged on the hydraulic oil, the first slider is connected to the buoy floating on the sea surface, and the buoy is used to drive the first slider to move in the transmission chamber;

the transmission chamber is connected to the compression chamber via a first pipeline, and a first one-way valve is arranged in the first pipeline, and the first one-way valve is used to control the hydraulic oil in the transmission chamber to flow into the compression chamber and prevent backflow, the oil storage chamber is filled with hydraulic oil and connected to the transmission chamber via a second pipeline, and a second one-way valve is arranged in the second pipeline, and the second one-way valve is used to control the hydraulic oil in the oil storage chamber to flow into the transmission chamber and prevent backflow;

the upper part of the compression chamber is connected to an air pipeline for the air discharge in the compression chamber, the air pipeline is provided with an air outlet one-way valve.

Preferably, a water tank is arranged above the compression chamber, the lower part of the water tank is provided with a first one-way water inlet valve, the upper part of the water tank is provided with a first one-way water outlet valve, and the first one-way outlet valve is connected to a water outlet pipeline;

a second slider is arranged in the compression chamber, and a third slider is arranged in the water tank, the second slider can drive the third slider to move up and down synchronously.

By setting the second slider in the compression chamber to drive the third slider in the water tank above moves up and down, the third slider rises to increase the pressure in the upper part and decrease the pressure in the lower part of the water tank, water enters the first one-way water inlet valve in the lower part and water exits the first one-way water outlet valve in the upper part, and seawater flows out from the water outlet pipeline to be further utilized.

Preferably, the second slider and the third slider are fixedly connected via a connecting rod.

It is a relatively simple and low-cost design scheme to fixed via the connecting rod, but it is necessary to take waterproof measures at the connection between the connecting rod and the water tank, and it is also can use the principle of like magnets repel each other to set magnetic blocks on the second slider and the third slider, so that the second slider drives the third slider to move up and down.

Preferably, the oil storage chamber is connected to the compression chamber via a third pipeline, a third one-way valve is arranged in the third pipeline, and the third one-way valve is used to control the hydraulic oil in the compression chamber to flow into the oil storage chamber and prevent backflow;

the top and bottom of the compression chamber are provided with a self-holding electromagnetic induction switch, the third one-way valve is provided with an electromagnet for controlling the third one-way valve to open or close, and the self-holding electromagnetic induction switch is electrically connected to the electromagnet to control the electromagnet to be energized or closed.

Due to the oil storage chamber is arranged, the hydraulic oil can form a path cycle of oil storage chamber→transmission chamber→compression chamber→oil storage chamber, so that the second slider and the third slider can form a reciprocating motion, and the wave energy can be reused, at the same time, due to the self-holding electromagnetic induction switch is arranged at the top and bottom of the compression chamber, when the second slider reaches a highest position, the self-holding electromagnetic induction switch detects that a magnetic flux increases and the switch is closed, so that the electromagnet is energized to open the third one-way valve, so that the hydraulic oil in the compression chamber flows into the oil storage chamber, and then the second slider drops, the self-holding electromagnetic induction switch is triggered when the second slider drops to a lowest point, the switch is closed, the electromagnet is deenergized, and the third one-way valve is closed, and the cycle is repeated.

In some preferred embodiments, the compression chamber and the transmission chamber are both cylinders, and a cross-sectional area of the compression chamber is larger than a cross-sectional area of the transmission chamber.

The transmission chamber and the compression chamber are both designed as cylinders, the first slider and the second slider can smoothly move up and down in their respective chambers and compress the hydraulic oil, due to the larger cross-sectional area of the compression chamber, the volume of the air stored in the compression chamber is larger, and the volume of the air squeezed out from the air outlet one-way valve at one time is also larger, which improves the efficiency of wave energy compression air. According to Pascal principle, $F=P*S$, hydraulic pressure intensity in the compression chamber and the transmission chamber is the same, but the cross-sectional area of the compression chamber is larger, so the hydraulic pressure intensity is also larger, the external work is greater, more air can be compressed and more seawater can be transported, which can be applied to pipeline cleaning and meet the requirements of large-scale marine ranching.

Preferably, the oil storage chamber is arranged surround the outside of the compression chamber.

Arranging the oil storage chamber surrounding the compression chamber can effectively utilize the space and improve stability.

Preferably, the upper part of the water tank is provided with a second one-way water inlet valve and the lower part of the water tank is provided with a second one-way water outlet valve.

With the rise of the third slider in the water tank, the air pressure in the upper increases and the air pressure decreases in the lower of the water tank, the first one-way water outlet valve in the upper part is opened by pressure, the first one-way water inlet valve in the lower part is opened, and the seawater flows into the pipeline from the first one-way water outlet valve; similarly, during the dropping, the second one-way water outlet valve in the lower part is opened, and the second one-way water inlet valve in the upper part is opened, thus converting wave energy into gravitational potential energy of water.

A second aspect of the present invention also provides a marine ranching feeding system, including the above-mentioned wave energy pressure amplification device, which further includes a turbine generator set, an air storage tank, a reservoir and a feeding pipeline, the turbine generator set is provided with a first air outlet and a second air outlet, the first air outlet is connected with the external air, and the air storage tank is provided with an air inlet and an air outlet;

the air pipeline includes a first branch pipe and a second branch pipe, the first branch pipe is connected to the air inlet of the air storage tank, and the first one-way valve is arranged between the two; the second branch pipe is connected to the second air outlet of the turbine generator set, and a second one-way valve is arranged between the two;

the reservoir is provided with a water inlet and a water outlet, and the water inlet is connected to the water outlet pipeline of the water tank;

the feeding pipeline is connected to a feed outlet of the marine ranching feeding system, the feeding pipeline is provided with a spray ring, a ring body of the spray ring is provided with a number of high-pressure air atomizing nozzles, the high-pressure air atomizing nozzle is connected to the outlet of the reservoir and the outlet of the air storage tank.

Preferably, the spray ring is arranged in the feeding pipeline close to the feed outlet.

Preferably, the spray rings are multiple, and at least one of the high-pressure air atomizing nozzles in the spray ring is oriented parallel to the feeding pipeline.

A third aspect of the present invention also provides a feeding method based on the above-mentioned marine ranching, including the following steps:

S1: opening a feeding outlet when receiving a feeding instruction;

S2: acquiring a pressure value in the air storage tank, and determining whether the pressure value in the air storage tank is greater than a first threshold value, and if so, opening valves on the air storage tank and the reservoir to make a high-pressure air-water mixture sprayed from the high-pressure air atomizing nozzle impacts feed in the feeding pipeline, and forming an air-water film on the wall of the feeding pipeline; delaying a preset time after the feeding outlet is closed, closing the valves on the air storage tank and the reservoir, and ending the feeding;

S3: if not, intermittently opening the valves on the air storage tank and the reservoir during the opening of the feeding outlet, and performing S4;

S4: continuously acquiring the pressure value in the air storage tank, when the pressure value in the air storage tank reaches the first threshold value, opening the valves on the air storage tank and the reservoir at the same time, performing pipeline cleaning after feeding, and ending the feeding.

Compared with the existing art, the beneficial effects of the present invention are as follows:

the first aspect of the present invention provides a wave energy pressure amplification device, the wave energy is collected by the buoy, and the fluctuation of the buoy is used to drive the first slider in the transmission chamber to move, when the first slider drops, the hydraulic oil in the transmission chamber is compressed, thus opening the first one-way valve, the hydraulic oil in the transmission chamber flows into the compression chamber, thereby increasing the pressure of the upper air in the compression chamber; when the first slider rises, the second one-way valve is opened, and the hydraulic oil in the oil storage chamber flows into the transmission chamber, when the buoy drives the first slider to drop again, the hydraulic oil in the transmission chamber flows into the compression chamber again and repeat, the hydraulic oil in the compression chamber gradually increases, and the upper air pressure in the compression chamber gradually increases, when the set value is reached, the air outlet one-way valve in the air pipeline is opened. The present invention uses a compression chamber to store air, and the pressure intensity of its internal air squeezed by hydraulic oil increases continuously, after reaching the set value, it is discharged from the air outlet one-way valve, so as to achieve the objective of amplifying the air outlet pressure, which is conducive to better utilization and conversion of wave energy.

The second aspect of the present invention provides a marine ranching feeding system based on the above-mentioned wave energy pressure amplification device, by connecting the above wave energy pressure amplification device to the existing marine ranching feeding system, and arranging the turbine generator set, air storage tank, reservoir and feeding pipeline, the air pipeline is connected to the turbine generator set, and the turbine generator set can be used to generate electricity when inhaling external air; the air storage tank and the reservoir are respectively connected to the air pipeline and the water outlet pipeline of the wave energy pressure amplification device, which can store the high-pressure air in the air storage tank and store the seawater in the reservoir during the operation of the wave energy pressure amplification device, and the air storage tank and the reservoir are connected to the high-pressure air atomizing nozzle on the spray ring in the feeding pipeline, during the feeding process of the marine ranching, on the one hand, the high-pressure air atomizing nozzle is used to form the air-water film on the inner wall of the pipeline to avoid the residue of the feed on the pipe wall and cause waste, on the other hand, the pipeline can be cleaned after the feeding is completed;

The third aspect of the present invention provides a feeding method based on the above-mentioned marine ranching feeding system, by controlling the high-pressure atomizing nozzle in the feeding process according to the pressure value of the high-pressure air in the air storage tank during the feed feeding process, the valve control can be adjusted in time and the pipeline can be effectively cleaned when the marine ranching feeding system is affected by the environment and the air storage is insufficient.

BRIEF DESCRIPTION OF THE DRAWINGS

To explain the embodiments of the present invention or the technical solutions in the prior art more clearly, a brief introduction will be made to the accompanying drawings used in the embodiments or the description of the prior art. It is obvious that the drawings in the description below are only some embodiments of the present invention, and those ordinarily skilled in the art can obtain other drawings according to these drawings without creative work.

In the figures: 1, a water tank; 2, a second one-way water inlet valve; 3, a third slider; 4, a first one-way water inlet valve; 5, a compression device; 6, an oil storage chamber; 7, a connecting rod; 8, a second slider; 9, a compression chamber; 10, an electromagnet; 11, a third one-way valve; 12, a first one-way valve; 13, a second one-way valve; 14, a transmission chamber; 15, a first slider; 16, a second one-way water outlet valve; 17, a water outlet pipeline; 18, a first one-way water outlet valve; 19, a rotation pin; 20, a buoy; 21, a self-holding electromagnetic induction switch; 22, an air pipeline; 23, an air outlet one-way valve; 24, an air inlet one-way valve; 25, an air inlet; 26, a turbine generator set; 27, a feed feeding platform; 28, a pressure relief valve; 29, an air storage tank; 30, a pressure gauge; 31, an valve; 32, a spray ring; 33, a feeding pipeline; 34, a drain outlet; 35, a reservoir; 36, an outer wall; 37, a high-pressure air atomizing nozzle; 38, a feed channel; 39, a spring.

DETAILED DESCRIPTION OF THE EMBODIMENTS

In order to make the objectives, the characteristics, and the advantages of the present invention more obvious and easy to understand, the following clearly and completely describes the technical solutions in embodiments of the present invention with reference to the embodiments of the present invention.

Apparently, the described embodiments are only some but not all of the embodiments of the present invention. All other embodiments obtained by those of ordinary skill in the art based on the embodiments of the present invention without involving any creative effort shall fall within the scope of protection of the present invention.

Figure 1:
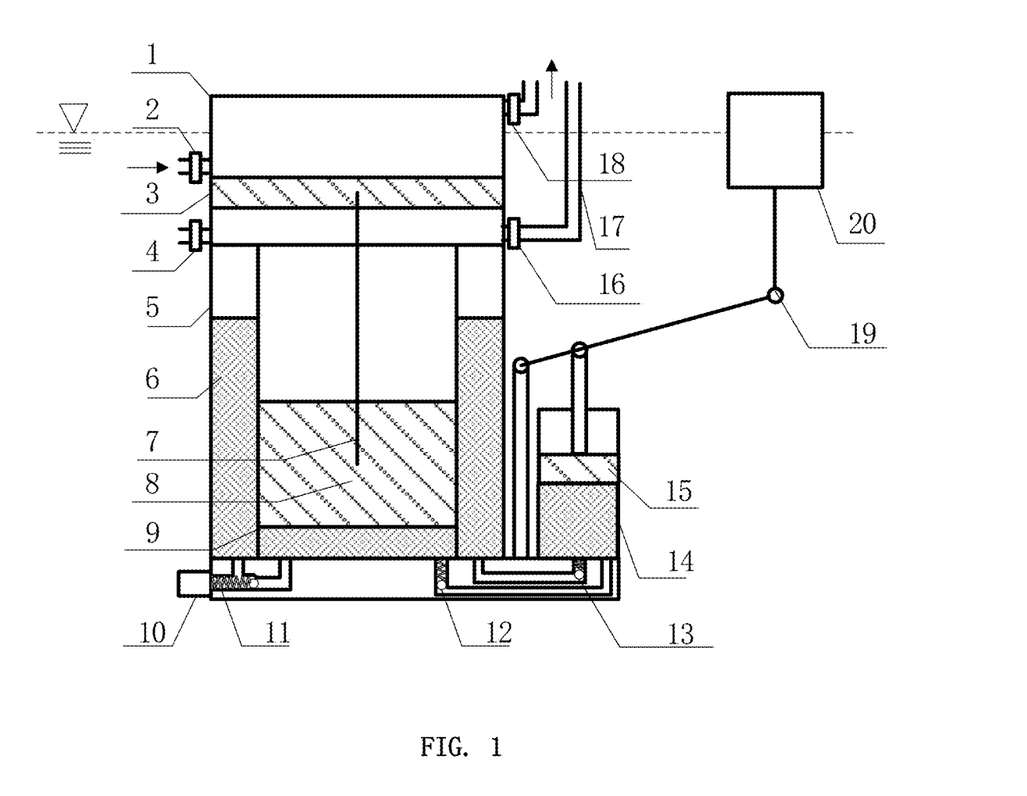
FIG. 1 is a schematic diagram of an overall structure of a wave energy pressure amplification device according to an embodiment of the present application.
Figure 2:
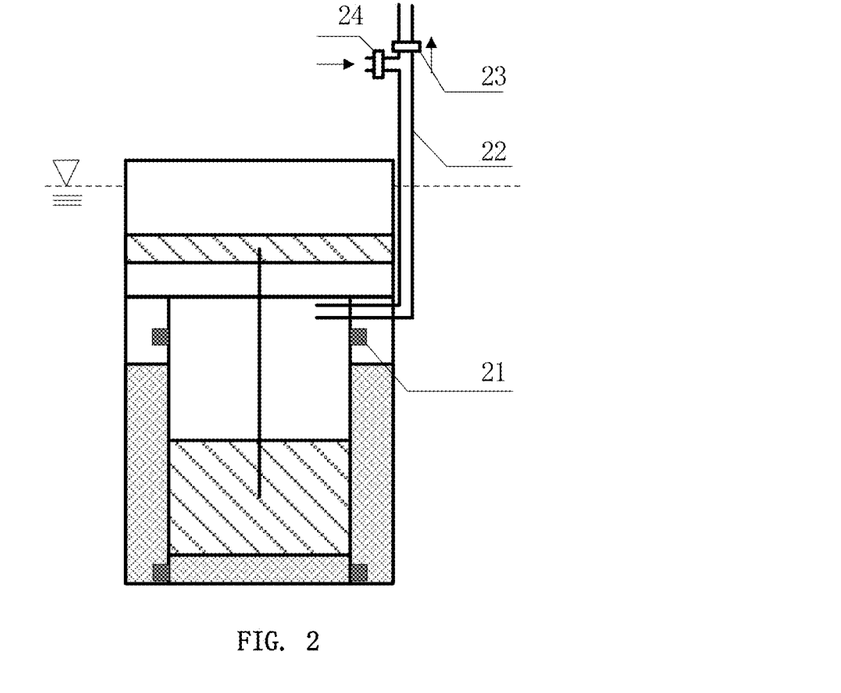
FIG. 2 is a schematic diagram of a connection structure of a compression device and an air pipeline in a wave energy pressure amplification device according to an embodiment of the present application.
Figure 3:
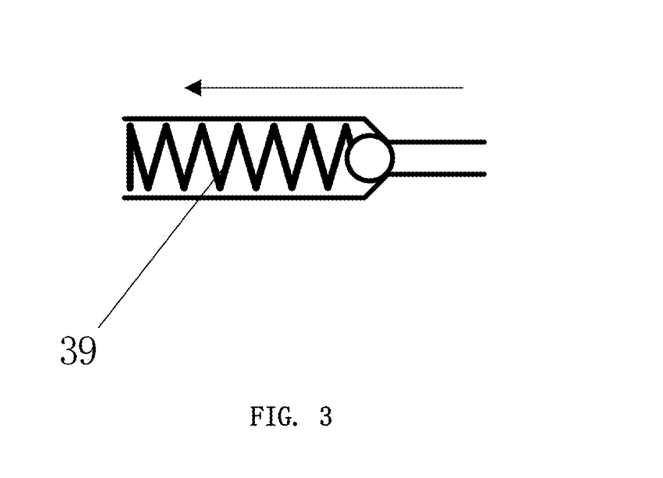
FIG. 3 is a schematic diagram showing the structure of a third one-way valve in a wave energy pressure amplification device according to an embodiment of the present application.

Embodiment 1, combined with FIG. 1 to FIG. 3, the embodiment provides a wave energy pressure amplification device, which mainly includes a water tank 1, a compression device 5 and a transmission chamber 14.

The compression device 5 includes a compression chamber 9 and an oil storage chamber 6 surrounding the outside of the compression chamber 9, the transmission chamber 14 is filled with hydraulic oil, and the transmission chamber 14 is connected to the compression chamber 9 via a first pipeline, and a first one-way valve 12 is arranged in the first pipeline to control the hydraulic oil in the transmission chamber 14 to flow into the compression chamber 9 and prevent backflow; the compression chamber 9 is connected to the oil storage chamber 6 via a third pipeline, and a third one-way valve 11 is arranged in the third pipeline to control the hydraulic oil in the compression chamber 9 to flow into the oil storage chamber 6 and prevent backflow; the oil storage chamber 6 is connected to the transmission chamber 14 via a second pipeline, and a second one-way valve 13 is arranged in the second pipeline to control the hydraulic oil in the oil storage chamber 6 to flow into the transmission chamber 14 and prevent backflow, thus, the hydraulic oil circulates in each chamber under the control of the one-way valve along the path of the transmission chamber 14→the compression chamber 9→the oil storage chamber 6→the transmission chamber 14. The water tank 1 is arranged above the compression chamber 9. A first slider 15 is arranged in transmission chamber 14, and the first slider 15 is connected to a buoy 20 through a connecting device.

In the embodiment, the first slider 15 is connected to the buoy 20 via the connecting device, and the specific structure is as follows: the connecting device includes a first connecting rod and a second connecting rod, and a second end of the first connecting rod is rotatably connected to a first end of the second connecting rod via a rotation pin 19; a first end of the first connecting rod is hinged to the main body of the amplification device, and the hinged position is higher than the transmission chamber 14; the first slider 15 is arranged between the first end and the second end of the first connecting rod; the second end of the second connecting rod is fixedly connected to the buoy 20.

In a more preferred embodiment, the second connecting rod is perpendicular to the buoy 20, and the buoy 20 floats on the sea surface and fluctuates with the wave, when the buoy 20 drops, the second end of the first connecting rod is driven downwardly by the second connecting rod, since the first end of the first connecting rod is fixed on the main body of the device, the first slider 15 can be driven by the first connecting rod to drop in the transmission chamber 14, thereby compressing the hydraulic oil in the transmission chamber 14.

A second slider 8 is arranged in the compression chamber 9, and a third slider 3 is arranged in the water tank 1, the third slider 3 moves synchronously with the second slider 8. In the embodiment, a relatively simple connecting rod 7 is used to connect the second slider 8 and the third slider 3, and a sealing structure is arranged at the connection between the connecting rod 7 and the water tank 1. Therefore, the distance between the third slider 3 and the second slider 8 is always a certain value. After the hydraulic oil enters the compression chamber 9, the second slider 8 rises, which drives the third slider 3 in the water tank 1 to rise. The upper part of the compression chamber 9 is also provided with an air pipeline 22, and an air outlet one-way valve 23 is arranged in the air pipeline 22, the second slider 8 compresses the above air to reach the set pressure intensity, and the outlet air one-way valve 23 is opened and flows out from the air pipeline 22.

In some other embodiments, the principle of like magnets repel each other can also be used to arrange magnets at the top of the second slider 8 and the bottom of the third slider 3 to replace the connecting rod 7, thereby reducing the cost of structural design.

The upper part of water tank 1 is provided with a first one-way water outlet valve 18 and a second one-way water inlet valve 2, the lower part of water tank 1 is provided with a first one-way water inlet valve 4 and a second one-way water outlet valve 16, the first one-way water outlet valve 18 and the second one-way water outlet valve 16 are connected to a water outlet pipeline 17 respectively, when the third slider 3 rises, the pressure in the lower part of water tank 1 decreases and the pressure in the upper part increases, so that the first one-way water inlet valve 4 in the lower part of water tank 1 opens, the second one-way water outlet valve 16 closes, and the seawater enters the lower part of the water tank from the first one-way water inlet valve 4; the second one-way water inlet valve 2 on the upper part of water tank 1 is closed, and the first one-way water outlet valve 18 is opened, the seawater in water tank 1 is discharged from the water outlet pipeline 17 through the first one-way water outlet valve 18.

The top and bottom of the compression chamber 9 are provided with a self-holding electromagnetic induction switch 21, the self-holding electromagnetic induction switch 21 is an existing art, that is, when it senses that the magnetic flux increases, the switch position changes, and when the magnetic flux decreases, the switch position remains, the switch position will change again only when the magnetic flux increases again.

Combined with FIG. 3, the third one-way valve 11 in the third pipeline is provided with an electromagnet 10, the valve disc of the third one-way valve 11 is provided with a metal part and connected with a spring 39, the other end of spring 39 is fixed on electromagnet 10. When the electromagnet 10 is energized, the valve disc is opened by adsorbing the metal part of the third one-way valve 11, and the spring 39 is compressed at the same time; when the power is turned off, the spring 39 rebounds, and the valve disc is reset to close the third one-way valve 11.

The electromagnet 10 is electrically connected to two self-holding electromagnetic induction switches 21, when the second slider 8 rises to the highest position, the self-holding electromagnetic induction switch 21 at the top of the compression chamber 9 senses the increase of magnetic flux, and the electromagnet 10 is connected, the third one-way valve 11 is controlled by the electromagnet 10 to open, the third one-way valve 11 is located in the third path connecting the compression chamber 9 and the oil storage chamber 6, so that the hydraulic oil in the compression chamber 9 can flow back to the oil storage chamber 6 to complete the flow cycle of the hydraulic oil, and then the above process is repeated, the wave energy pressure amplification device can continuously store or directly utilize the pressure potential energy of converting wave energy into air.

At this time, the oil pressure borne by the second slider 8 decreases gradually under the action of gravity, and drives the third slider 3 in water tank 1 to drop, the pressure in the upper part of water tank 1 decreases, while the pressure in the lower part increases, so that the second one-way water inlet valve 2 in the upper part of water tank 1 opens, the first one-way water outlet valve 18 closes, the first one-way water inlet valve 4 in the lower part closes, the second one-way water outlet valve 16 opens, and the seawater flows out from the water outlet pipeline 17.

When the second slider 18 moves to the bottom of the compression chamber 9, the self-holding electromagnetic induction switch 21 at the bottom of the compression chamber 9 senses an increase in magnetic flux and controls the deenergized of the electromagnet 10, the spring 39 reset of the third one-way valve 11 closes the third one-way valve 11, and the compression chamber 9 and the oil storage chamber 6 are no longer connected.

Similarly, when the buoy 20 rises, the first slider 15 in the transmission chamber 14 rises, the second one-way valve 13 in the second path opens and the first one-way valve 12 in the first path closes, and the hydraulic oil in the oil storage chamber 6 flows into the transmission chamber 14, and the flow of this hydraulic oil does not involve the compression chamber 9, so the second slider 8 does not act.

Since the compression chamber 9 and the transmission chamber 14 are both cylinders, the first slider 15 and the second slider 8 can choose a larger bottom area, which can move smoothly in their respective chambers, and is conducive to squeezing the hydraulic oil, the cross-sectional area of the compression chamber 9 is larger than the cross-sectional area of the transmission chamber 14, and the two are equivalent to forming a connector, according to Pascal principle: $F=P*S$, the pressure intensity is certain, when the cross-sectional area increases, it is equivalent to amplifying the pressure, the hydraulic oil in the compression chamber 9 drives the second slider 8 to rise, and then compresses the air in the upper part of the compression chamber 9, and the cross-sectional area of the compression chamber 9 is larger, and more air can be stored in it, thereby improving the efficiency of compressed air; the air pressure in the upper part of the compression chamber 9 gradually increases, when the set value is reached, the air outlet one-way valve 23 in the air pipeline 22 is opened, and the air pressure flows out of the air pipeline 22 is amplified, which can be applied to pipeline cleaning and meet the requirements of large-scale marine ranching, it can also store the air flowing out of air pipeline 22 and the seawater flowing out of water pipeline 17, and convert the amplified pressure into the gravitational potential energy of water and the pressure potential energy of air.

Figures 4, 5:
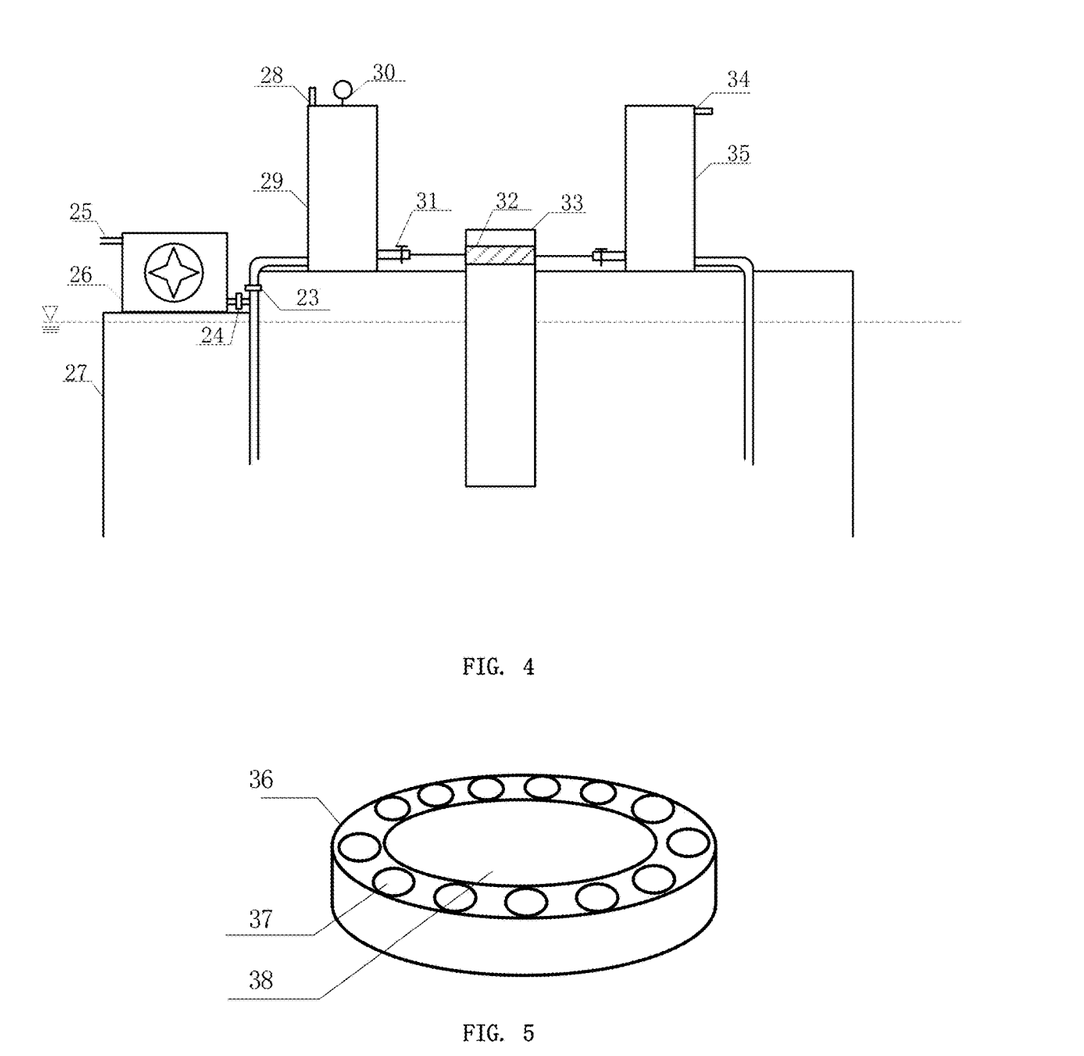
FIG. 4 is a schematic diagram of an overall structure of a high-pressure air cleaning device according to an embodiment of the present application.
FIG. 5 is a schematic diagram of the structure of a spray ring in a high-pressure air cleaning device according to an embodiment of the present application.

Embodiment 2, combined with FIG. 4 and FIG. 5, on the basis of embodiment 1, this embodiment further provides a marine ranching feeding system, including the wave energy pressure amplification device in embodiment 1.

In this embodiment, the wave energy pressure amplification device in embodiment 1 is connected to the existing marine ranching feeding system to form the marine ranching feeding system in this embodiment;

specifically, the marine ranching feeding system in this embodiment is based on embodiment 1 and the existing marine ranching feeding system, which further includes a turbine generator set 26, an air storage tank 29, a reservoir 35 and a feeding pipeline 33, wherein the feeding pipeline 33 is connected to a feed outlet of the existing marine ranching feeding system; the rest of the marine ranching feeding system is common knowledge and will without further elaboration;

the turbine generator set 26 is provided with a first air outlet 25 and a second air outlet, and the air storage tank 29 is provided with an air inlet and an air outlet;

the turbine generator set 26 and the air storage tank 29 are connected to the compression chamber 9 of the wave energy pressure amplification device through the air pipeline 22 of the wave energy pressure amplification device, specifically, the air pipeline 22 includes a first branch pipe and a second branch pipe (refer to FIG. 2), wherein the first branch pipe is connected to the air inlet of the air storage tank 29, and the air outlet one-way valve 23 is arranged between the two; the second branch pipe is connected to the second air outlet of the turbine generator set 26, and the air inlet one-way valve 24 is arranged between the two;

when the second slider 8 in the compression chamber 9 rises, the air pressure in the upper part of the compression chamber 9 increases, the air outlet one-way valve 23 opens, the air inlet one-way valve 24 closes, and the compressed air in the upper part of the compression chamber 9 is discharged from the air pipeline 22, and flows into the air storage tank 29 through the first branch pipe to be stored in a higher pressure form;

when the second slider 8 in the compression chamber 9 drops, the air pressure in the upper part of the compression chamber 9 decreases, and at this time, the air inlet one-way valve 24 opens, the air outlet one-way valve 23 closes, and air enters the turbine generator set 26 from the air inlet 25 and flows into the compression chamber 9 via the second branch pipe while driving the turbine generator set 26 to operate. At this time, the turbine generator set 26 drives the blades to rotate by the flowing air flow and outputs electric power, and the generated electric power is stored in the storage battery, and can supply electric power to the electric control switch of the present apparatus or the remaining load of the marine ranch platform.

Further, a pressure gauge 30 and a pressure relief valve 28 are arranged on the air storage tank 29, and the pressure gauge 30 is electrically connected to the pressure relief valve 28 to feedback the pressure value signal to the feeding system, so as to control the pressure relief valve 28 to vent the air storage tank 29 when the pressure in the air storage tank 29 exceeds the set value;

In a preferred embodiment, the pressure relief valve 28 is connected to the air inlet 25 via the pipeline, and the pressure relief valve 28 is controlled to delay the vent to the air storage tank 29 when the pressure in the air storage tank 29 exceeds the set value, that is, when the pressure gauge 30 sends a signal to the system control end, the higher pressure air in the pressure relief valve 28 will rush into the air inlet 25 through the delayed vent, and drive the turbine generator set 26 to operate, this part is set according to the air storage capacity of the air storage tank 29 and the air that can be compressed by the wave energy pressure amplification device in one feeding cycle of the feeding system, based on the above improvements, technicians in this field can make selective settings in combination with their feeding system, this part of the improvement is also within the scope of the research results of the inventor of the present invention.

The reservoir 35 is connected to the water outlet pipe 17 of the water tank 1, during the movement of the slider 3 in the water tank 1, the seawater is injected into the reservoir 35 via the water outlet pipe 17 of the water tank 1, there is also a drain outlet 34 at the top of the reservoir 35, which can be discharged from the drain outlet 34 when the seawater overflows.

A spray ring 32 is arranged on the feeding pipeline 33, specifically, the spray ring 32 is fixed on the inner wall of the feeding pipeline 33, and an outer wall 36 of the spray ring 32 is fitted with the inner wall of the feeding pipeline 33; a hollow part of the spray ring 32 and the feeding pipeline 33 together constitute a feed channel 38;

a number of high-pressure air atomizing nozzles 37 are arranged on the ring body of the spray ring 32 surrounding the feed channel 38, the air outlet of the air storage tank 29 and the water outlet of the reservoir 35 are connected to the high-pressure air atomizing nozzle 37 on the spray ring 32 via the pipeline, wherein the valves 31 are all arranged in the connected pipeline.

Since the high-pressure air atomizing nozzle 37 is simultaneously connected to the air storage tank 29 and the reservoir 35, when two valves 31 are opened at the same time, the high-pressure air in the air storage tank and the seawater in the reservoir enter the feeding pipeline 33 together to form a high-pressure air-water mixture.

In a more preferred embodiment, the marine ranching feeding system is further equipped with multiple sets of the wave energy pressure amplification devices, and the air pipeline 22 of each wave energy pressure amplification device is connected to the air storage tank 29, and the water outlet pipeline 17 of each wave energy pressure amplification device is connected to the reservoir 35, so that the air storage tank 29 and the reservoir 35 can maintain a good operating state under the condition that the feeding system has a large working intensity or is expected to feed more feed, so as to avoid additional pumping or pressurization device.

Through the above structure, on the one hand, after feeding pipeline 33 completes the feeding of feed, when the two valves 31 open at the same time, the air and seawater flow into the feeding pipeline 33 at the same time, a high-speed air-liquid mixture is formed under the gravity of seawater and air pressure to realize the high-pressure flushing of feeding pipeline 33;

on the other hand, two valves 31 are opened while feeding pipeline 33 is feeding, when the high-pressure air atomizing nozzle 37 in spray ring 32 is parallel to the pipeline or biased to the outer wall of feeding pipeline 33, an air-water film can be formed on the inner wall of the pipeline, so as to avoid direct contact between feed and pipe wall, reduce the residue of feed on the pipe wall, and cause waste;

Further, by setting multiple spray ring 32, and the direction of the high-pressure air atomizing nozzle 37 in different spray ring 32 is different, different spray ring 32 can be controlled to open under different requirements, for example, in a specific scheme, the direction of the high-pressure air atomizing nozzle 37 in the spray ring 32 can be set, and the direction of the high-pressure air atomizing nozzle 37 is toward the middle of the pipeline, so that the air-liquid mixture impacts the feed to make the feed feeding more uniform and dispersed.

Based on the marine ranching feeding system in the above embodiment, the present invention further provides a marine ranching feeding control method, which includes:

S1: a feeding outlet is opened when receiving a feeding instruction;

S2: a pressure value in the air storage tank is acquired, and determined whether the pressure value in the air storage tank is greater than a first threshold value, and if so, valves on the air storage tank and the reservoir are opened to make a high-pressure air-water mixture sprayed from the high-pressure air atomizing nozzle impacts feed in the feeding pipeline, and an air-water film on the wall of the feeding pipeline is formed; a preset time is delayed after the feeding outlet is closed, the valves on the air storage tank and the reservoir are closed, and the feeding is ended;

based on the above method, when the pressure value in the air storage tank is higher, the high-pressure air-water mixture is sprayed during the feed feeding process, on the one hand, the feed is impacted to make the feed feeding more uniform and dispersed, on the other hand, an air-water protective film is formed to prevent the feed from adhering to the pipe wall; the first threshold can be set according to the feeding time of the marine ranching feeding system, the air storage capacity in the air storage tank, and the upper limit of pressure, the first threshold is the pressure value of the air storage tank that can effectively form a high-pressure air-water mixture at least at the end of the feeding time.

S3: if not, the valves on the air storage tank and the reservoir are intermittently opened during the opening of the feeding outlet, and S4 is performed;

S4: the pressure value in the air storage tank is continuously acquired, when the pressure value in the air storage tank reaches the first threshold value, the valves on the air storage tank and the reservoir are opened at the same time, and pipeline cleaning is performed after feeding.

Based on the above method, when the pressure value in the air storage tank is insufficient, the high-pressure air-water mixture is intermittently sprayed during the feed feeding process to prevent feed adhesion, and when the pressure in the air storage tank reaches the preset value, the pipeline is cleaned as soon as possible to maintain the cleanliness of the pipeline.

It should be noted that during the pipeline cleaning process, when seawater flows out of the reservoir, it will naturally fall due to gravity, and it can still clean the pipeline to a certain extent and prevent feed adhesion when the air pressure is insufficient, based on the above technical scheme of the present invention, the pumping device can be further increased, and in extreme cases, the water supply of the reservoir can be carried out based on the power generation of the feeding system.

Compared with the existing art, the present invention further uses the wave energy pressure amplification device to collect high-pressure air, and adopts the control method of dynamic coordination with the air storage condition to carry out the cleaning control of the feed feeding process under the condition of energy saving and environmental protection, so as to keep the pipeline clean; based on the above control method, the pipeline cleaning control can be further carried out in the wave energy pressure amplifier under extreme conditions to further improve the cleaning efficiency of the feeding system. In a more preferred embodiment, without considering the cost, the corresponding air pressure device can be added to supplement the pressure when the pressure in the air storage tank is insufficient.

In a more preferred embodiment, if there is no additional pumping device is used to water supplement in extreme cases, in the above steps, the volume of water stored in the reservoir can be further determined, that is, whether the volume of water stored in the reservoir meets the preset threshold is considered at the same time, and the spray mode of the high-pressure air-water mixture is adjusted.

S1: a feeding outlet is opened when receiving a feeding instruction;

S2: a volume of seawater in the reservoir is acquired, and determined whether the volume of seawater in the reservoir is greater than a second threshold, and if so, valves on the air storage tank and the reservoir are opened to make a high-pressure air-water mixture sprayed from the high-pressure air atomizing nozzle impacts feed in the feeding pipeline, and an air-water film on the wall of the feeding pipeline is formed; a preset time is delayed after the feeding outlet is closed, the valves on the air storage tank and the reservoir are closed, and the feeding is ended;

S3: if not, the valves on the air storage tank and the reservoir are intermittently opened during the opening of the feeding outlet, and S4 is performed;

S4: after ending the feeding, the volume of the seawater in the water outlet pipe is continuously acquired, when the volume of the seawater reaches the second threshold value, the valves on the air storage tank and the reservoir are opened at the same time, pipeline cleaning is performed after feeding.

It is to be noted that, similarly, the second threshold can be set according to the feeding time of the marine ranching feeding system, the volume of seawater in the reservoir, the upper limit of the volume of seawater, and the second threshold is still sufficient seawater to flush the feeding pipeline at least at the end of the feeding time.

In a more preferred embodiment, it is possible to consider both the determination of the volume of water in the reservoir and the determination of the pressure data in the air storage tank, including:

S1: a feeding outlet is opened when receiving a feeding instruction;

S2: a pressure value in the air storage tank and a volume of seawater in the reservoir is acquired, and determined whether the pressure value in the air storage tank is greater than a first threshold value and the volume of seawater in the reservoir is greater than a second threshold, and if so, valves on the air storage tank and the reservoir are opened to make a high-pressure air-water mixture sprayed from the high-pressure air atomizing nozzle impacts feed in the feeding pipeline, and an air-water film on the wall of the feeding pipeline is formed; a preset time is delayed after the feeding outlet is closed, the valves on the air storage tank and the reservoir are closed, and the feeding is ended;

S3: if not, S4 is performed when the pressure value in the air storage tank is greater than the first threshold value or when the pressure value in the air storage tank is not greater than the first threshold value and the volume of seawater is not greater than the second threshold value; S5 is performed when the volume of seawater in the reservoir is greater than the second threshold;

S4: the valves on the air storage tank and the reservoir are intermittently opened during the opening of the feeding outlet, after ending the feeding, the volume of the seawater in the water outlet pipe is continuously acquired, when the volume of the seawater reaches the second threshold value, the valves on the air storage tank and the reservoir are opened at the same time, pipeline cleaning is performed after feeding, and the control is ended.

S5: the valve on the reservoir is opened during the opening of the feeding outlet, and the valve on the air storage tank is intermittently opened; after ending the feeding, the pressure value in the air storage tank is continuously acquired, when the pressure value in the air storage tank reaches the first threshold value, the valves on the air storage tank and the reservoir are opened at the same time, pipeline cleaning is performed after feeding.

The present invention organically integrates wave energy power generation, compressed air and pipeline cleaning, and can realize the cleaning of feeding pipelines without land-based energy, thus reducing the operating cost of the marine ranching, and in combination with the Pascal principle, the one-way valve is used to realize the pressure amplification, so that low-grade wave energy is converted into potential energy of air and seawater, and the capacity utilization rate is high, the air compression process is performed under the sea surface, and the generated heat is rapidly diffused, thus improving the compression efficiency; after the compressed air enters the air storage tank, the air flow of the air inlet pushes the turbine set to operate, which makes full use of the pressure difference between the inside and outside air and is suitable for promotion and use.

As described above, it should be noted that the above embodiments are merely used for describing the technical solutions of the present invention, rather than limiting the same. Although the present invention has been described in detail with reference to the foregoing embodiments, those of ordinary skill in the art should understand that the technical solutions disclosed in the above-mentioned embodiments can still be modified, or some of the technical features thereof can be replaced by equivalents. However, these modifications or substitutions should not make the modified technical solutions deviate from the spirit and scope of the technical solutions of the present invention.

What is claimed is:

1. A wave energy pressure amplification device, comprising a transmission chamber, a compression chamber, an oil storage chamber and a buoy; wherein the transmission chamber is filled with hydraulic oil, a first slider is arranged on the hydraulic oil, the first slider is connected to the buoy floating on a sea surface, and the buoy is used to drive the first slider to move in the transmission chamber;

the transmission chamber is connected to the compression chamber via a first pipeline, a first one-way valve is arranged in the first pipeline, and the first one-way valve is used to control the hydraulic oil in the transmission chamber to flow into the compression chamber and prevent backflow;

the oil storage chamber is filled with hydraulic oil and connected to the transmission chamber via a second pipeline, a second one-way valve is arranged in the second pipeline, and the second one-way valve is used to control the hydraulic oil in the oil storage chamber to flow into the transmission chamber and prevent backflow;

an upper part of the compression chamber is connected to an air pipeline for an air discharge in the compression chamber, and the air pipeline is provided with an air outlet one-way valve;

a water tank is arranged above the compression chamber, a lower part of the water tank is provided with a first one-way water inlet valve, an upper part of the water tank is provided with a water outlet pipeline, and the water outlet pipeline is provided with a first one-way water outlet valve;

a second slider is arranged in the compression chamber, a third slider is arranged in the water tank, and the second slider moves synchronously with the third slider;

the oil storage chamber is connected to the compression chamber via a third pipeline, a third one-way valve is arranged in the third pipeline, and the third one-way valve is used to provide the hydraulic oil in the compression chamber to flow into the oil storage chamber;

a top and a bottom of the compression chamber are provided with a self-holding electromagnetic induction switch, the third one-way valve is provided with an electromagnet for controlling the third one-way valve to open or close, and the self-holding electromagnetic induction switch is electrically connected to the electromagnet to control the electromagnet to be energized or closed;

the compression chamber and the transmission chamber are both cylinders, and a cross-sectional area of the compression chamber is larger than a cross-sectional area of the transmission chamber.

2. The wave energy pressure amplification device according to claim 1, wherein the second slider and the third slider are fixedly connected via a connecting rod.

3. The wave energy pressure amplification device according to claim 1, wherein the oil storage chamber is arranged to surround an outside of the compression chamber.

4. The wave energy pressure amplification device according to claim 1, wherein the upper part of the water tank is provided with a second one-way water inlet valve, and the lower part of the water tank is provided with a second one-way water outlet valve.

5. A marine ranching feeding system, comprising: the wave energy pressure amplification device according to claim 1, a turbine generator set, an air storage tank, a reservoir, and a feeding pipeline; wherein the turbine generator set is provided with a first air outlet and a second air outlet, the first air outlet is connected with an external air, and the air storage tank is provided with an air inlet and an air outlet;

the air pipeline comprises a first branch pipe and a second branch pipe, wherein the first branch pipe is connected to the air inlet of the air storage tank, and an air outlet one-way valve is arranged between the first branch pipe and the air inlet of the air storage tank; the second branch pipe is connected to the second air outlet of the turbine generator set, and an air inlet one-way valve is arranged between the second branch pipe and the second air outlet of the turbine generator set;

the reservoir is provided with a water inlet and a water outlet, and the water inlet is connected to the water outlet pipeline of the water tank;

the feeding pipeline is connected to a feed outlet of the marine ranching feeding system, the feeding pipeline is provided with a spray ring, a ring body of the spray ring is provided with a plurality of high-pressure air atomizing nozzles, each of the plurality of high-pressure air atomizing nozzles is connected to the water outlet of the reservoir and the air outlet of the air storage tank.

6. The marine ranching feeding system according to claim 5, wherein the spray ring is arranged in the feeding pipeline and adjacent to the feed outlet.

7. The marine ranching feeding system according to claim 6, wherein the spray rings are multiple, wherein, at least one of the high-pressure air atomizing nozzles in the spray ring is oriented parallel to the feeding pipeline.

8. A marine ranching feeding method, using the marine ranching feeding system according to claim 6, and comprising the following steps:

S1: opening a feeding outlet when receiving a feeding instruction;

S2: acquiring a pressure value in the air storage tank, and determining whether the pressure value in the air storage tank is greater than a first threshold value, and if so, opening valves on the air storage tank and the reservoir to allow a high-pressure air-water mixture sprayed from the high-pressure air atomizing nozzle to impact feed in the feeding pipeline, and forming an air-water film on a wall of the feeding pipeline; delaying a preset time after the feeding outlet is closed, closing the valves on the air storage tank and the reservoir, and ending the feeding;

S3: if not, intermittently opening the valves on the air storage tank and the reservoir during the opening of the feeding outlet, and performing S4; and S4: continuously acquiring the pressure value in the air storage tank, when the pressure value in the air storage tank reaches the first threshold value, opening the valves on the air storage tank and the reservoir at a same time, performing pipeline cleaning after feeding, and ending the feeding.

9. The marine ranching feeding method according to claim 8, wherein in the marine ranching feeding system, the spray rings are multiple, wherein, at least one of the high-pressure air atomizing nozzles in the spray ring is oriented parallel to the feeding pipeline.

10. The marine ranching feeding system according to claim 5, wherein in the wave energy pressure amplification device, the second slider and the third slider are fixedly connected via a connecting rod.

11. The marine ranching feeding system according to claim 5, wherein in the wave energy pressure amplification device, the oil storage chamber is arranged surround an outside of the compression chamber.

12. The marine ranching feeding system according to claim 5, wherein in the wave energy pressure amplification device, the upper part of the water tank is provided with a second one-way water inlet valve, and the lower part of the water tank is provided with a second one-way water outlet valve.

* * * * *